United States Patent
Dominguez (10) Patent No.: US 7,496,237 B1
(45) Date of Patent: Feb. 24, 2009

(54) IMAGE PROCESSING FOR BINARIZATION ENHANCEMENT VIA FUZZY REASONING

(75) Inventor: Jesus A. Dominguez, Orlando, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 874 days.

(21) Appl. No.: 11/010,698

(22) Filed: Dec. 1, 2004

Related U.S. Application Data (60) Provisional application No. 60/533,641, filed on Jan. 2, 2004.

(51) Int. Cl.
G06K 9/36 (2006.01)
G06K 9/40 (2006.01)

(52) U.S. Cl. .................... 382/237; 382/274

(58) Field of Classification Search ............. 382/237, 382/274
See application file for complete search history.

(56) References Cited

U.S. PATENT DOCUMENTS

| | | | |
|---|---|---|---|
| 4,554,593 A * | 11/1985 | Fox et al. ............. | 358/3.24 |
| 4,853,970 A * | 8/1989 | Ott et al. ............. | 382/266 |
| 5,179,599 A | 1/1993 | Formanek | |
| 5,293,430 A * | 3/1994 | Shiau et al. ........... | 382/173 |
| 5,377,020 A | 12/1994 | Smitt | |
| 5,434,927 A | 7/1995 | Brady et al. | |
| 5,442,462 A | 8/1995 | Guissin | |
| 5,479,526 A * | 12/1995 | Benton et al. .......... | 382/103 |
| 5,481,620 A | 1/1996 | Vaidyanathan | |
| 5,590,220 A | 12/1996 | Takahashi | |
| 5,651,077 A | 7/1997 | Dong et al. | |
| 5,754,709 A | 5/1998 | Moriya et al. | |
| 5,761,326 A | 6/1998 | Brady et al. | |
| 5,784,490 A * | 7/1998 | Akra et al. ........... | 382/215 |
| 5,799,111 A | 8/1998 | Guissin | |
| 5,870,495 A * | 2/1999 | Mancuso et al. ....... | 382/199 |
| 5,880,767 A * | 3/1999 | Liu .................... | 347/251 |
| 5,933,540 A * | 8/1999 | Lakshminarayanan et al. ... | 382/260 |
| 5,974,174 A * | 10/1999 | Hozumi .............. | 382/199 |
| 6,016,370 A * | 1/2000 | Hatakeyama et al. .... | 382/299 |
| 6,094,508 A | 7/2000 | Acharya et al. | |
| 6,137,907 A * | 10/2000 | Clark et al. .......... | 382/180 |
| 6,185,336 B1 * | 2/2001 | Clark et al. .......... | 382/224 |

(Continued)

OTHER PUBLICATIONS

Zhang, Impulse Noise Detection Using Laplacian Operators and Fuzzy Logic, IEEE 2002, p. 845-484.*

Primary Examiner—Jingge Wu
Assistant Examiner—Kathleen S Yuan
(74) Attorney, Agent, or Firm—Randall M. Heald; William A. Blake (57) ABSTRACT

A technique for enhancing a gray-scale image to improve conversions of the image to binary employs fuzzy reasoning. In the technique, pixels in the image are analyzed by comparing the pixel's gray scale value, which is indicative of its relative brightness, to the values of pixels immediately surrounding the selected pixel. The degree to which each pixel in the image differs in value from the values of surrounding pixels is employed as the variable in a fuzzy reasoning-based analysis that determines an appropriate amount by which the selected pixel's value should be adjusted to reduce vagueness and ambiguity in the image and improve retention of information during binarization of the enhanced gray-scale image.

20 Claims, 5 Drawing Sheets

U.S. PATENT DOCUMENTS

| | | |
|---|---|---|
| 6,285,801 B1 | 9/2001 | Mancuso et al. |
| 6,347,153 B1 | 2/2002 | Triplett et al. |
| 6,498,660 B2 * | 12/2002 | Haltmaier .................. 358/2.1 |
| 6,671,395 B1 * | 12/2003 | Ott et al. ..................... 382/137 |
| 6,798,906 B1 * | 9/2004 | Kato ........................... 382/176 |
| 7,057,595 B1 * | 6/2006 | Benyoub et al. ............... 345/89 |
| 7,085,013 B2 * | 8/2006 | Yamakawa ................... 358/2.1 |
| 7,336,390 B2 * | 2/2008 | Ogawa ........................ 358/1.2 |
| 2004/0042645 A1 * | 3/2004 | Wang ........................ 382/125 |

* cited by examiner

FIG. 1

| 0,0 | 0,1 | 0,2 |
| --- | --- | --- |
| 1,0 | 1,1 | 1,2 |
| 2,0 | 2,1 | 2,2 |

IMAGE PROCESSING FOR BINARIZATION ENHANCEMENT VIA FUZZY REASONING

CROSS REFERENCE TO RELATED APPLICATIONS

This application claims priority under 35 U.S.C. 119(e) on U.S. Provisional Application No. 60/533,641, which was filed on Jan. 2, 2004.

This application is also related to U.S. application Ser. No. 10/779,551, filed Feb. 11, 2004 and U.S. application Ser. No. 10/783,295, filed Feb. 19, 2004, both of which are commonly owned with the subject application.

ORIGIN OF THE INVENTION

The invention described herein was made in the performance of work under a NASA contract and is subject to the provisions of Public Law 96-517 (35 U.S.C. §202) in which the contractor has elected not to retain title.

BACKGROUND OF THE INVENTION

1. Field of the Invention

The present invention relates in general to a method and system for converting gray-scale images to binary images which employs fuzzy reasoning to enhance a gray-scale image before the image is converted to a binary image. When the enhanced gray-scale image is converted to a binary image, the binary image retains more of the detailed information that was contained in the original gray-scale image.

2. Description of the Background Art

Binarization of a gray-scale/color image is a fundamental tool for image processing since a binary image (1-bit image) can be processed with very fast logical (Boolean) operators and also be used to digitize text and numbers originally contained in gray-scale/color images (typically 8-bit images). The binary digitization of text and numbers contained in gray-scale images has a wide application that includes, but is not limited to, Object Character Recognition (OCR). In a binary digital image, a binary one value indicates that the pixel belongs to the image foreground, which may represent an object in the image, while a binary zero value indicates that the pixel is darker and belongs to the image's background. Since most image display systems and software employ gray-scale images of 8 or more bits per pixel, the binarization of these images usually takes 2 extreme gray tones, black and white, which are ordinarily represented by 0 or 255, respectively, in an 8-bit gray-scale display environment.

One of the key goals of performing binarization of gray-scale images is to be able to digitize text and numbers contained in a gray-scale image acquired outdoors where the image acquisition conditions (lighting, camera/video stabilization, weather, etc.) are uncontrolled. Due to the physical properties of the imaging devices and due to the image transmission, these uncontrolled conditions can result in the degradation of the gray-scale images such that they have poor contrast, are corrupted with different kinds of noise or are blurred. As a result, it is often more difficult to binarize the text and numbers contained in such images; for example, the binarization and final digitization of a car's license tag numbers face these problems, thus making their binarization/digitization unfeasible or unreliable.

Various Image enhancement techniques are available that are utilized to increase the contrast, smooth the regions of interest and sharpen the edges and fine structures in the images. These techniques comprise different classes of point and spatial operations and are typically selected in accordance with the ultimate purpose on the outputted image and the quality criterion (or criteria) of the original (input) image. To date, however, no known enhancement technique exists for specifically improving the binarization/digitization of a gray-scale image so that certain features, such as text or numbers, remain discernable in the image after binarization.

SUMMARY OF THE INVENTION

The present invention addresses the need for improving the content of images generated by binarization of gray-scale images by providing an image enhancement technique that enhances poor-quality input gray-scale images by contrasting their image brightness via a fuzzy reasoning-based inference method to overcome vagueness and generate outputted gray-scale images that are particularly suited for conversion to binary images. Fuzzy reasoning is a logical reasoning technique that attempts to mimic more accurately how the human brain reasons. Fuzzy techniques are nonlinear, knowledge-based and robust. They can process imperfect data if this imperfection originates from vagueness and ambiguity rather than randomness. Under the fuzzy reasoning approach, a logic problem becomes more than deciding whether to assign a particular value to a particular pixel or parameter. Fuzzy reasoning goes one step further and recognizes that there is information contained in the degree to which a given value possesses one or more particular characteristics.

In the specific application of converting a gray-scale image to a binary image, the inventor has discovered that if vagueness and ambiguity is first removed from the gray-scale image using a fuzzy reasoning-based inference method before the binarization process, then when the enhanced gray-scale image is converted to binary, the resulting binary image retains more detailed information from the original gray-scale image. To eliminate vagueness and ambiguity in the gray-scale image, the technique of the present invention analyzes each pixel in the image by comparing the pixel's gray scale value, which is indicative of its relative brightness, to the values of pixels immediately surrounding the selected pixel. If the value of the selected pixel differs greatly from the average value of the surrounding pixels, this is an indication that the selected pixel's value is most likely an anomaly in the image that will contribute to the image's vagueness and ambiguity. If the selected pixel's value is then adjusted to bring it closer to the average value of the surrounding pixels, then the vagueness and ambiguity in the image will be reduced. It is not sufficient, however, to merely adjust the selected pixel's value to be equal to the average value of the surrounding pixels for each pixel in an image is expected to differ to a certain extent from its neighboring pixels. This is where fuzzy reasoning comes into play in the present invention. In particular, the degree to which each pixel in the image differs in value from the values of surrounding pixels is employed as the variable in a fuzzy reasoning-based analysis that determines an appropriate amount by which the selected pixel's value should be adjusted to reduce vagueness and ambiguity in the image.

Using fuzzy reasoning-based analysis, an image made up of an array of pixels can thus be considered as an array of fuzzy singletons, each having a dimensionless membership value between 0.0 and 1.0 that denotes its degree of having a particular characteristic. The membership value for each pixel is determined by using an input membership function. In the preferred embodiment of the present invention, a plurality of triangular membership functions, preferably five, is employed, each of which defines a degree to which the value of each pixel in the image differs from the average values of pixels surrounding the selected pixel. In other words, the membership functions each define a degree to which the selected pixel differs in brightness from the surrounding pixels. In the preferred embodiment, the five functions specifically include: much darker, slightly darker, equal, slightly brighter and much brighter. The dimensionless membership value is assigned for each function and pixel value. A membership value of 0.0 indicates that the pixel does not posses the particular characteristic at all, while a membership value of 1.0 indicates that the pixel fully possesses the particular characteristic. In the preferred embodiment, the triangular membership functions are formed using a technique known as Mandani's method and overlap one another such that some pixels in the image will have values in more than one of the functions.

To determine a crisp output value for use in adjusting the value of a selected pixel, thereby enhancing the image, a plurality of output membership functions is employed, each of which corresponds to one of the input membership functions. Using a singleton-based inference method also known as True Value Flow Interference is (TVFI), a weighted average of the values for each singleton is determined and this value, which can be positive or negative, is then added to the selected pixel value to make the pixel either darker or brighter.

Experiments using the subject technique have confirmed that if a gray-scale image is first enhanced using the subject technique and then this enhanced image is converted to binary, the resulting image will retain more of certain kinds of information, such as text and numbers.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE PREFERRED EMBODIMENT

Figure 1:
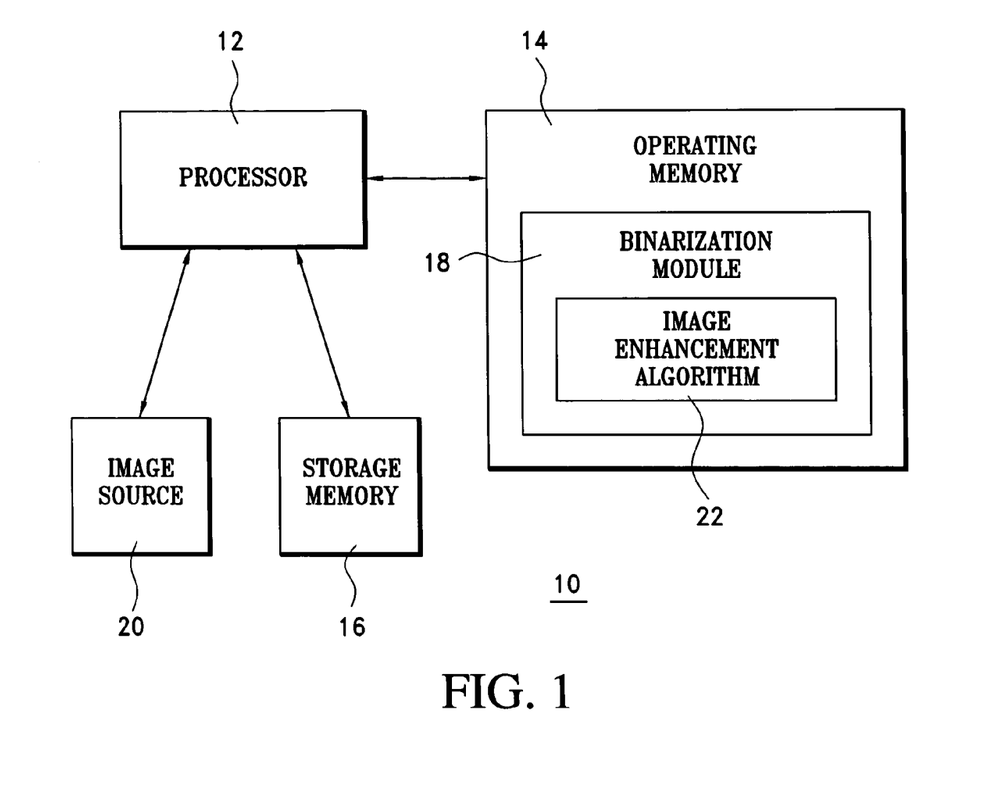
FIG. 1 is a block diagram of a computer system for converting gray-scale images to binary images using a fuzzy reasoning based image enhancement technique in accordance with the preferred embodiment of the present invention.

With reference to FIG. 1, a computer system 10 is illustrated which is configured to convert multiple bit gray-scale digital images into binary images using any suitable technique, such as the image thresholding technique disclosed in copending U.S. application Ser. No. 10/779,551, filed Feb. 11, 2004 and which is referred to as Fuzzy Reasoning Adaptive Thresholding (FRAT). The system 10 includes a processor 12 which is interfaced to an operating memory 14 and a storage memory 16, as is conventional. Loaded into the operating memory 14 is a binarization program or software module 18.

Gray-scale images to be converted to binary are either retrieved from the storage memory 16 or from an external image source 20 and are fed into the binarization program 18, which performs the conversion. To accomplish this, the binarization program 18 includes an image enhancement algorithm or subroutine 22 that preprocesses the gray-scale images before they are converted to binary. Each gray-scale image is analyzed by the image enhancement algorithm 22 and modified if necessary to improve the conversion to binary such that more of certain types of information, such as text or numbers, are retained in the image after the binarization conversion.

Figure 2:
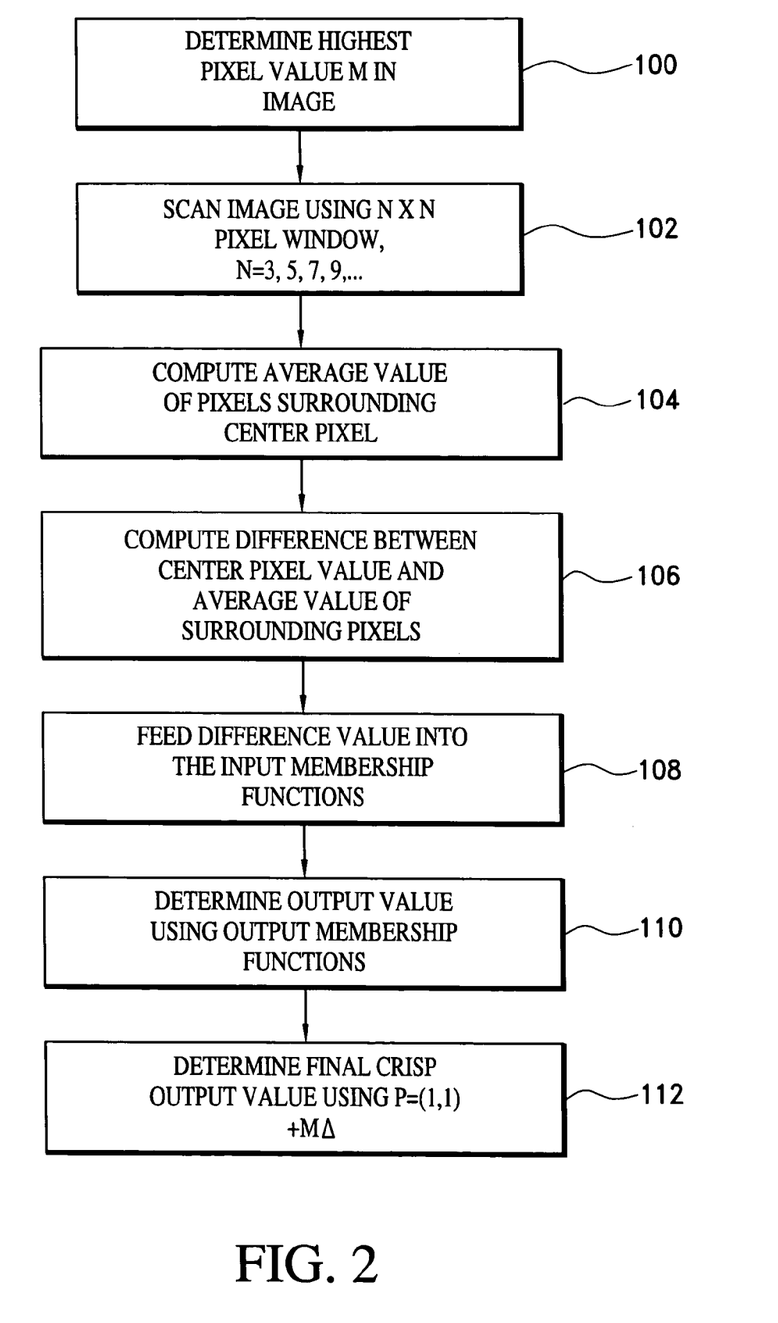
FIG. 2 is a flowchart showing the steps carried out by the image enhancement technique of the preferred embodiment.

The image enhancement algorithm 22 implements a computational technique that is based on fuzzy reasoning and is designed to adjust the brightness of each pixel in the image based on the average brightness of surrounding pixels. The flow chart of FIG. 2 illustrates the steps carried out by the enhancement algorithm 22 to adjust each pixel in the gray-scale image as necessary to improve its subsequent binarization. The first preliminary step 100 is to scan the entire image and find the highest pixel value (M). This value will be used later during determination of the amount that each pixel's value can be adjusted and defines an upper bound for pixel values in the image.

Figure 3:
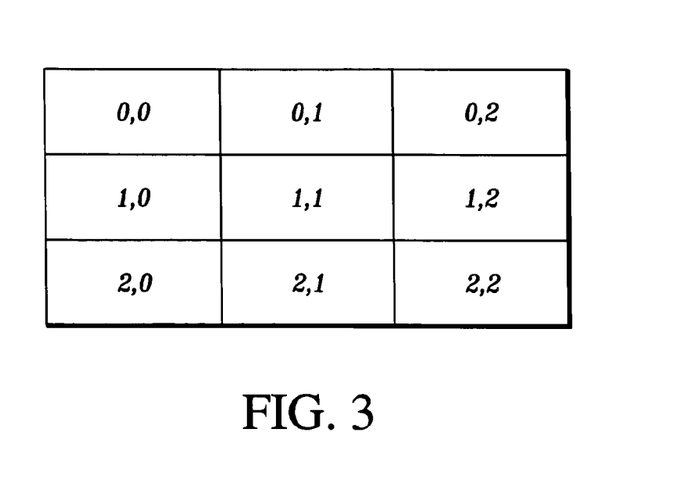
FIG. 3 is an illustration of a 3×3 pixel window that is employed in the preferred embodiment to scan a gray-scale image and determine the difference in values between a center pixel (1,1) in the window and the average value of the eight surrounding pixels in the window.

Next, at step 102, scanning of the image begins using an n×n window, where n=3, 5, 7, 9, . . . , and with the selected pixel being the center pixel in the window. In the preferred embodiment of the present invention, the gray scale value of each pixel in the image to be binarized is compared to the average values of the pixels surrounding the selected pixel. FIG. 3 illustrates an example 3×3 window where the center pixel labeled (1,1) is the selected pixel to be adjusted and there are 8 surrounding pixels.

Here, the neighboring pixels are identified as (0,0), (0,1), (0,2), (1,0), (1,2), (2,0), (2,1) and (2,2). The next step 104 is to compute the average value N for the neighboring pixels. In this example, each pixel is represented by an 8 bit value that identifies its relative brightness, with 0 representing black or no brightness and 255 representing white or full brightness. N is calculated using equation (1), where the numbers in parentheses represent the pixel values for the designated pixels in the window:

$$N = \frac{(0,0) + (0,1) + (0,2) + (1,0) + (1,2) + (2,0) + (2,1) + (2,2)}{8} \quad (1)$$

Next, at step 106, the normalized difference d between the average value N and the value of the selected pixel (1,1) is computed using the equation (2):

$$d = \frac{N - (1, 1)}{255} \qquad (2)$$

The resulting value of d will be between 0.0 and 1.0, since the value of N—(1,1) is divided by 255, the highest possible pixel value in this example. The reason for normalizing the difference value is so that this value can be used as a dimensionless input membership value at step 108 to one or more membership functions. This is where fuzzification occurs using a fuzzy set method known as the Mandani method. In the preferred embodiment, five such functions are employed as illustrated in the left hand graph of FIG. 4A. The membership functions are selected so that each defines a different degree to which the selected pixel differs in brightness from the average value N of the pixels in the selected window. In the preferred embodiment, the five functions specifically include: much darker, slightly darker, equal, slightly brighter and much brighter. A dimensionless membership output value is assigned for each function and difference input value. A membership value of 0.0 indicates that the pixel does not posses the particular characteristic at all, while a membership value of 1.0 indicates that the pixel fully possesses the particular characteristic.

Figure 4A:
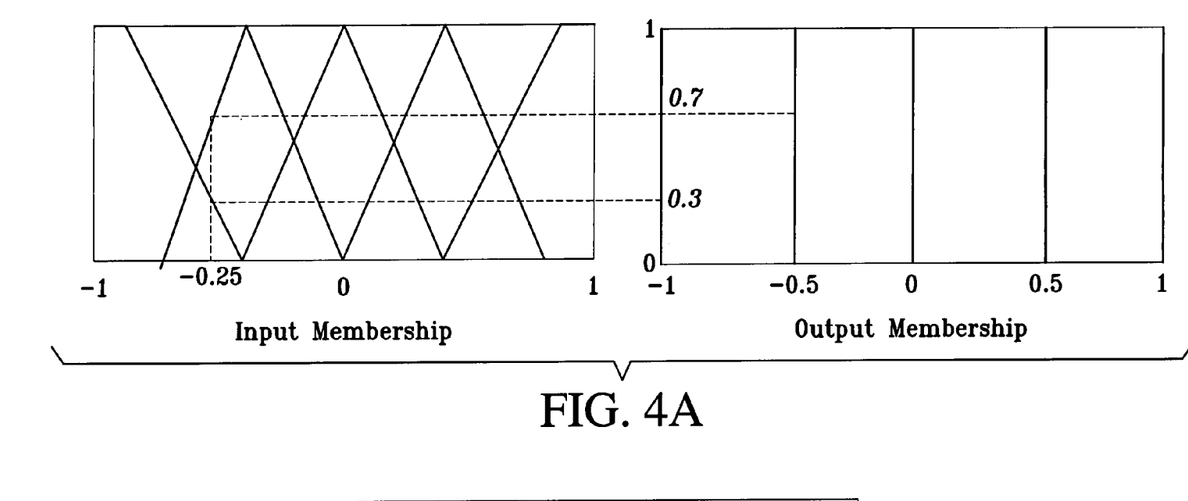
FIG. 4A illustrates first and second membership graphs and a mapping relationship between the two that are employed in the preferred embodiment for performing a fuzzy reasoning based image enhancement on a pixel by pixel basis, the first graph on the left being of five triangular input membership functions and the graph on the right being of 5 singleton type output membership functions.

As illustrated in FIG. 4A, the Mandani-type input membership functions are triangular. In the preferred embodiment, the starting and end points for the input membership functions are as follows: Much Darker: (−1.0, 1.00) (−0.6, 1.00) (0.0, 0.0) (1.0, 0.0); Slightly Darker: (−1.0, 0.0) (−0.6, 0.0) (0.3, 1.00) (0.0, 0.0) (1.0, 0.0); Equal: (−1.0, 0.0) (−0.2, 0.0) (0.0, 1.0) (0.2, 0.0) (1.0, 0.0); Slightly Brighter:(−1.0, 0.0) (0.0, 0.0) (0.3, 1.00) (0.6, 0.0) (1.0, 0.0); and Much Brighter: (−1.0, 0.0) (0.0, 0.0) (0.6, 1.0) (1.0, 1.0).

The next step of the process involves application of the following five inference rules: 1) if N (average value of surrounding pixels) is equal to the value of the selected pixel, (1,1), then make no change to the pixel value; 2) if N is much darker than (1,1), then make a high decrement to the pixel value; 3) if N is slightly darker than (1,1), then make a medium decrement to the pixel value; 4) if N is much brighter than (1,1), then make a high increment to the pixel value; and, 5) if N is slightly brighter than (1,1), then make a medium increment to the pixel value. These rules are applied through application of the outputs generated by the input membership functions as inputs to five corresponding output membership functions as illustrated in the right-hand graph of FIG. 4A. The output membership functions are based on a method referred to as the Truth Value Flow Inference (TVFI) method that uses singletons instead of triangular membership functions as used in the Mandani method. Thus, instead of being triangular, the output membership functions are simply represented by vertical lines at each of 5 equally spaced intervals along the horizontal axis as follows: high decrement=−1.0; medium decrement=−0.5; no change=0.0; medium increment=0.5; and high increment=1.0.

Figure 4B:
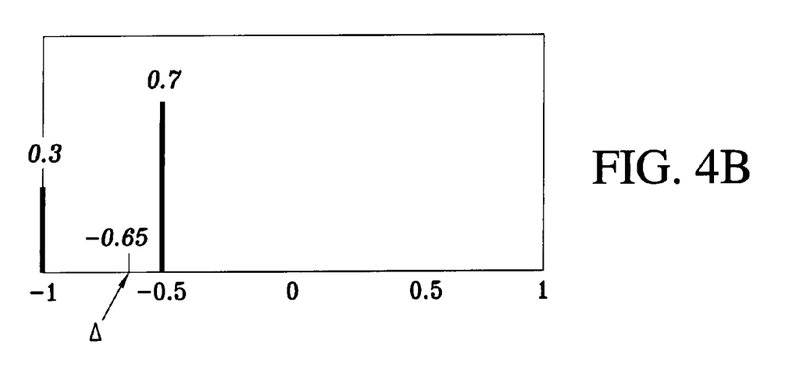
FIG. 4B is a graphical illustration of how an adjustment value for a selected pixel is determined from the output values of the membership output function of FIG. 4A.

The next step 110 is thus to determine the output values from the output membership functions based on the inference rules applied by the input membership functions and the union of singletons at the output membership functions. As an example, FIGS. 4A and 4B illustrate the case where the difference value d obtained from equation (2) is determined to be −0.25. In FIG. 4A, the value −0.25 is used as input to the input membership functions, which produces values of 0.3 for the much darker function and 0.7 for the slightly darker function. These two values trigger rules 2) and 3) that lead to the mapping of their corresponding output functions, high decrement from rule 2) and medium decrement from rule 3).

The final step 112 is the defuzzification step in which the crisp output value by which the selected pixel's value will be adjusted is determined. First, the increment/decrement weight value Δ is determined by taking the weighted average of the output membership function values illustrated in FIG. 4A. Here, Δ is calculated as—(1.0) (0.3)+−(0.5) (0.7), which equals −0.65 as illustrated in FIG. 4B. The final computation of the new pixel value P for the selected pixel is determined by equation (3):

$$P=(1,1)+M\Delta \qquad (3)$$

where M is the maximum pixel value in the image found in step 100.

Once the selected pixel value is adjusted by MΔ, the algorithm returns to step 102 for the next pixel in the image. This process continues until all pixels in the image, with the exception of the pixels along the four edges of the image, have been adjusted in accordance with the enhancement algorithm. The edge pixels are not included because a 3×3 window cannot be formed around them. If a larger window, such as 5×5, 7×7, etc. were employed, multiple rows of pixels along the edges of the image would have to be excluded from the enhancement process.

Figure 5A:
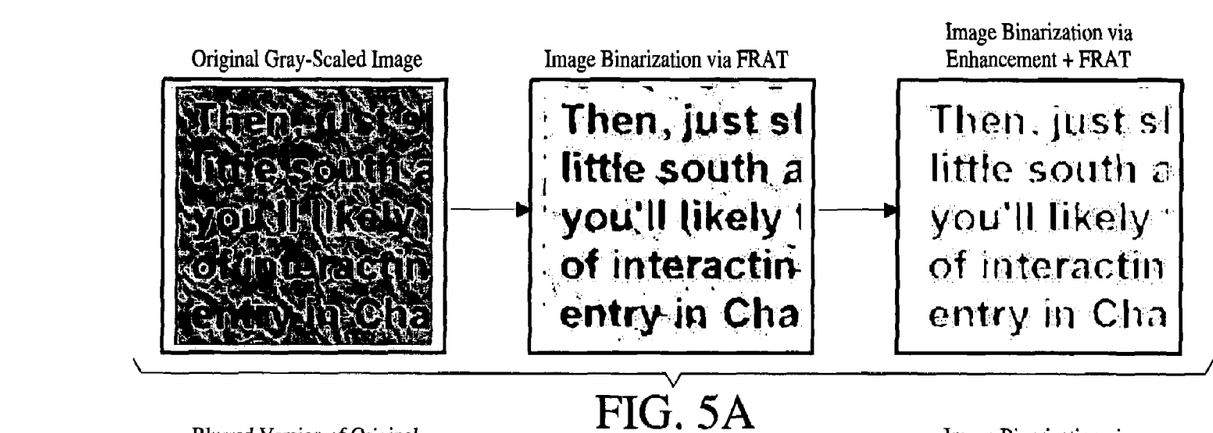
FIGS. 5A and 5B are illustrations of gray-scale images that have been converted to binary both with and without the image enhancement technique of the preferred embodiment.
Figure 5B:
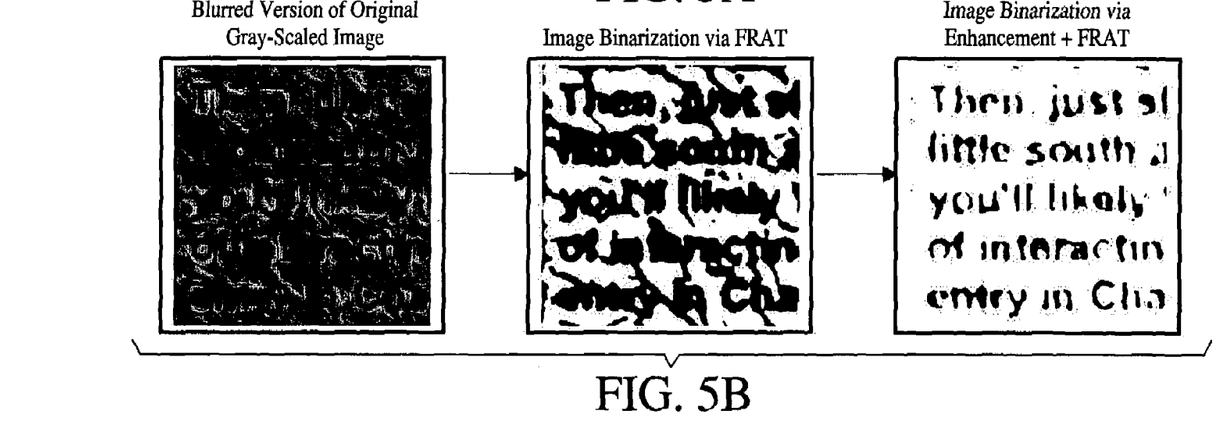
Figure 6:
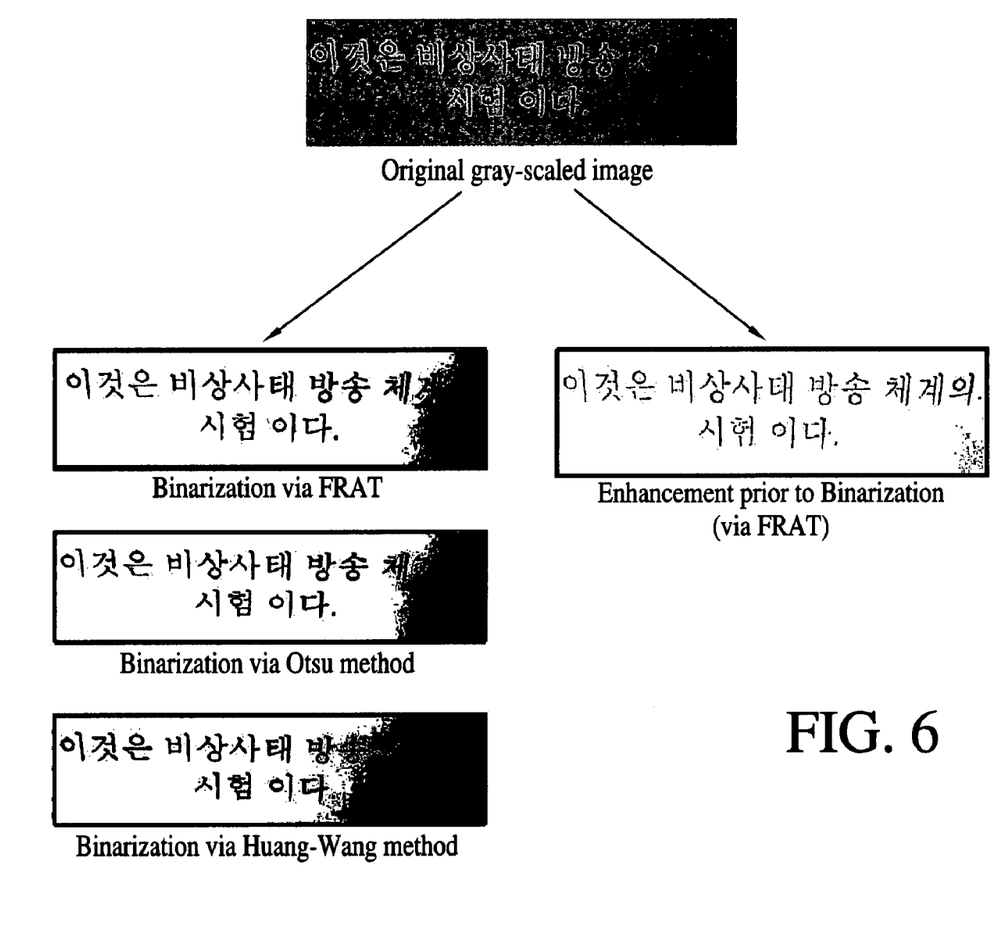
FIG. 6 shows another gray-scale image and four different binary conversions thereof, three of which were obtained with three different known binarization techniques, but without the image enhancement technique of the subject invention and the fourth of which was obtained using the image enhancement technique of the subject invention before binarization with the FRAT binarization technique.

To demonstrate the effectiveness of the subject image enhancement technique, various types of gray-scale images were converted to binary using the aforementioned FRAT and other binarization techniques, both with and without the subject image enhancement technique. The resulting images are illustrated in FIGS. 5A, 5B and 6. FIGS. 5A and 5B show the results of the enhancement approach and its respective FRAT binarization of two noisy text images holding different blurring levels. As may be seen in FIG. 5B, especially for the blurred text image, the enhancement approach yields better-binarized images.

Finally, FIG. 6 perhaps provides the most vivid demonstration of the effectiveness of the subject enhancement technique. In FIG. 6, a gray-scaled image containing Korean characters is binarized using three different adaptive methods: FRAT, Otsu, and Huang-Wang. Each method fails to digitize all the characters since the background has a dark area at the right with pixel values approaching those of the characters. However, when the subject image enhancement technique is applied prior to the binarization (via FRAT), every character appears in the resulting binary image.

In conclusion, the subject image enhancement technique utilizes fuzzy ruled-based reasoning to handle the uncertainty, imprecision and incompleteness naturally involved in the binarization of gray-scaled/color images. The enhancement technique tolerates approximate reasoning and partial truth in order to achieve tractability, robustness, low solution cost and a close resemblance to human like decision making on gray-scaled/color images prior to its binarization. The technique provides sufficient provision for representing the uncertainties at the gray-scaled image so its binarization, the next stage, can be associated with less uncertainty and better performance.

Although the invention has been disclosed in terms of a preferred embodiment, it will be understood that modifications and variations could be made thereto without departing from the scope of the invention as set forth in the following claims.

What is claimed is:

1. A computer-based method for converting a gray-scale multiple pixel image to a binary image, said method comprising the steps of:
   a) loading a gray-scale image to be converted to a binary image into an operating memory of a computer, said gray-scale image being formed of a plurality of pixels, each pixel having a value that defines a relative brightness level of said pixel;
   b) enhancing said gray-scale image by executing an application with said computer that adjusts the brightness level of pixels in said image, said application carrying out the steps of:
      1) determining a difference value by which a value of a selected pixel in said image differs in brightness from an average brightness value of a plurality of pixels surrounding said selected pixel;
      2) employing said difference value as input to a plurality of overlapping triangular fuzzy set type membership input functions to determine a corresponding plurality of membership values for said selected pixel;
      3) applying said plurality of membership values as inputs to a corresponding plurality of single valued singleton type fuzzy membership output functions, each of which generates a single valued output;
      4) generating a crisp output value from said single valued outputs from said membership output functions that identifies a relative amount by which said selected pixel's brightness should be adjusted
      5) adjusting the brightness of said selected pixel by adding said crisp output value to said selected pixel value to obtain an adjusted pixel value for said selected pixel;
      6) repeating steps (1)-(5) for additional pixels in said image, thereby generating an enhanced gray-scale image; and
   c) converting said enhanced gray-scale image to a binary image.

2. The method of claim 1, wherein said crisp output value is derived from a weighted average of said single valued outputs from said membership output functions.

3. The method of claim 2, wherein said crisp output value is generated by multiplying said weighted average of said single valued outputs by a maximum pixel value in said gray-scale image to be converted to binary.

4. The method of claim 1, wherein at least five each of said input membership functions and said output membership functions are employed.

5. The method of claim 4, wherein five of said input membership functions are provided and define a degree to which said selected pixel is much darker, somewhat darker, equal to, somewhat brighter or much brighter than the average brightness of said surrounding pixels.

6. The method of claim 5, wherein five of said singleton type fuzzy membership output functions are provided which correspond to the five membership input functions and the single valued outputs from said output functions indicate a degree to which the brightness of said pixel should be subject to a high decrement, a medium decrement, no change, a medium increment, and a high increment, respectively.

7. The method of claim 1, wherein an n×n pixel window is employed to determine the average value of pixels surrounding said selected pixel, with the selected pixel located at the center of the window and n being an odd number of 3 or greater.

8. A computer-based method for converting a gray-scale multiple pixel image to a binary image, said method comprising the steps of:
   a) loading a gray-scale image to be converted to a binary image into an operating memory of a computer, said gray-scale image being formed of a plurality of pixels, each pixel having a value that defines a relative brightness level of said pixel;
   b) enhancing said gray-scale image by executing an application with said computer that adjusts the brightness level of pixels in said image, said application carrying out the steps of:
      1) determining a difference value by which a value of a selected pixel in said image differs in brightness from an average brightness value of a plurality of pixels surrounding said selected pixel wherein an n×n pixel window is employed to determine the average value of pixels surrounding said selected pixel, with the selected pixel located at the center of the window and n being an odd number of 3 or greater;
      2) employing said difference value as input to a plurality of overlapping triangular fuzzy set type membership input functions to determine a corresponding plurality of membership values for said selected pixel;
      3) applying said plurality of membership values as inputs to a corresponding plurality of single valued singleton type fuzzy membership output functions, each of which generates a single valued output;
      4) generating a crisp output value from said single valued outputs from said membership output functions that identifies a relative amount by which said selected pixel's brightness should be adjusted;
      5) adjusting the brightness of said selected pixel by adding said crisp output value to said selected pixel value to obtain an adjusted pixel value for said selected pixel;
      6) repeating steps (1)-(5) for additional pixels in said image, thereby generating an enhanced gray-scale image; and
   c) converting said enhanced gray-scale image to a binary image.

9. The method of claim 8, wherein said crisp output value is derived from a weighted average of said single valued outputs from said membership output functions.

10. The method of claim 9, wherein said crisp output value is generated by multiplying said weighted average of said single valued outputs by a maximum pixel value in said gray-scale image to be converted to binary.

11. The method of claim 8, wherein at least five each of said input membership functions and said output membership functions are employed.

12. The method of claim 11, wherein five of said input membership functions are provided and define a degree to which said selected pixel is much darker, somewhat darker, equal to, somewhat brighter or much brighter than the average brightness of said surrounding pixels.

13. The method of claim 12, wherein five of said singleton type fuzzy membership output functions are provided which correspond to the five membership input functions and the single valued outputs from said output functions indicate a degree to which the brightness of said pixel should be subject to a high decrement, a medium decrement, no change, a medium increment, and a high increment, respectively.

14. A computer system for converting for converting a gray-scale multiple pixel image to a binary image comprising:
    a) a processor;

b) an operating memory;

c) a source of multiple pixel gray-scale digital images; and d) a program for performing a conversion of said gray-scale multiple pixel images into binary images, said program including a method for enhancing a gray-scale image before converting said enhanced image to binary, said method comprising the steps of:

1) loading a gray-scale image to be converted to a binary image into said operating memory, said gray-scale image being formed by a plurality of pixels, each pixel having a value that defines a relative brightness level of said pixel;

2) enhancing said gray-scale image by executing an application with said processor that adjusts the brightness level of pixels in said image, said application carrying out the steps of:

i) determining a difference value by which a value of a selected pixel in said image differs in brightness from an average brightness value of a plurality of pixels surrounding said selected pixel;

ii) employing said difference value as input to a plurality of overlapping triangular fuzzy set type membership input functions to determine a corresponding plurality of membership values for said selected pixel;

iii) applying said plurality of membership values as inputs to a corresponding plurality of single valued singleton type fuzzy membership output functions, each of which generates a single valued output;

iv) generating a crisp output value from said single valued outputs from said membership output functions that identifies a relative amount by which said selected pixel's brightness should be adjusted;

v) adjusting the brightness of said selected pixel by adding said crisp output value to said selected pixel value to obtain an adjusted pixel value for said selected pixel; and vi) repeating steps (i)-(v) for additional pixels in said image, thereby generating an enhanced gray-scale image; and 3) converting said enhanced gray-scale image to a binary image.

15. The system of claim 14, wherein said crisp output value is derived from a weighted average of said single valued outputs from said membership output functions.

16. The system of claim 15, wherein said crisp output value is generated by multiplying said weighted average of said single valued outputs by a maximum pixel value in said gray-scale image to be converted to binary.

17. The system of claim 14, wherein at least five each of said input membership functions and said output membership functions are employed.

18. The system of claim 17, wherein five of said input membership functions are provided and define a degree to which said selected pixel is much darker, somewhat darker, equal to, somewhat brighter or much brighter than the average brightness of said surrounding pixels.

19. The system of claim 18, wherein five of said singleton type fuzzy membership output functions are provided which correspond to the five membership input functions and the single valued outputs from said output functions indicate a degree to which the brightness of said pixel should be subject to a high decrement, a medium decrement, no change, a medium increment, and a high increment, respectively.

20. The system of claim 14, wherein an n×n pixel window is employed to determine the average value of pixels surrounding said selected pixel, with the selected pixel located at the center of the window and n being an odd number of 3 or greater.

* * * * *